(12) United States Patent
Sharma et al.

(10) Patent No.: US 11,038,926 B2
(45) Date of Patent: Jun. 15, 2021

(54) SYSTEM AND METHOD FOR EMBEDDING INFRASTRUCTURE SECURITY SERVICES INTO MANAGEMENT NODES

(71) Applicant: VMWARE, INC., Palo Alto, CA (US)

(72) Inventors: Dinesh Sharma, Bangalore (IN); Ammar Rizvi, Bangalore (IN); Akash Kodenkiri, Bangalore (IN); Raunak Ravindra Singwi, Bangalore (IN); Prabhavathi Guttalahunase Munikempegowda, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 290 days.

(21) Appl. No.: 16/375,855

(22) Filed: Apr. 5, 2019

(65) Prior Publication Data
US 2020/0236145 A1 Jul. 23, 2020

(30) Foreign Application Priority Data
Jan. 23, 2019 (IN) .............................. 201941002762

(51) Int. Cl.
*H04L 29/06* (2006.01)
*H04L 12/24* (2006.01)

(52) U.S. Cl.
CPC ............ *H04L 63/205* (2013.01); *H04L 41/12* (2013.01); *H04L 41/28* (2013.01); *H04L 63/164* (2013.01)

(58) Field of Classification Search
CPC ....... H04L 63/205; H04L 41/12; H04L 41/28; H04L 63/164
See application file for complete search history.

(56) References Cited

U.S. PATENT DOCUMENTS

| | | | |
|---|---|---|---|
| 8,108,548 B2* | 1/2012 | Teodosiu | H04L 67/104 709/238 |
| 9,575,856 B2* | 2/2017 | Sugabrahmam | G06F 9/45558 |
| 10,152,356 B2* | 12/2018 | Raikov | G06F 9/5077 |
| 10,462,009 B1* | 10/2019 | Shiramshetti | H04L 41/12 |
| 10,715,594 B2* | 7/2020 | Kovacheva | G06F 9/4881 |

(Continued)

FOREIGN PATENT DOCUMENTS

| CN | 106020934 A | * | 10/2016 | |
|---|---|---|---|---|
| WO | WO-2013005208 A1 | * | 1/2013 | .......... G06F 11/1484 |

*Primary Examiner* — Lynn D Feild
*Assistant Examiner* — Solomon Arega

(57) ABSTRACT

In one example, a cloud computing environment may be probed to detect an actual topology including connectivity between infrastructure security nodes and management nodes. Each management node may execute a corresponding centralized management service. Each infrastructure security node may execute a corresponding infrastructure security service that handles at least one infrastructure security function. Further, a set of candidate topologies may be generated based on the actual topology. Each candidate topology may indicate a way to replicate the infrastructure security service into the management nodes. Furthermore, a replication partner associated with each of the management nodes may be determined based on a selection of one of the candidate topologies. An operation to deploy the infrastructure security service on the management nodes may be executed based on the selected one of the candidate topologies and the determined replication partners to form an embedded linked mode architecture.

20 Claims, 13 Drawing Sheets

(56) References Cited

U.S. PATENT DOCUMENTS

| | | | |
|---|---|---|---|
| 10,776,246 B2* | 9/2020 | Knowles | G06F 11/3466 |
| 2015/0106809 A1* | 4/2015 | Reddy | G06F 9/45558 |
| | | | 718/1 |
| 2016/0188425 A1* | 6/2016 | Duggana | G06F 11/2025 |
| | | | 714/4.11 |
| 2018/0167275 A1* | 6/2018 | Kovacheva | H04L 41/0816 |
| 2021/0036891 A1* | 2/2021 | Babbar | H04L 45/741 |

* cited by examiner

SYSTEM AND METHOD FOR EMBEDDING INFRASTRUCTURE SECURITY SERVICES INTO MANAGEMENT NODES

RELATED APPLICATIONS

Benefit is claimed under 35 U.S.C. 119(a)-(d) to Foreign Application Serial No. 201941002762 filed in India entitled "SYSTEM AND METHOD FOR EMBEDDING INFRASTRUCTURE SECURITY SERVICES INTO MANAGEMENT NODES", on Jan. 23, 2019, by VMWARE, Inc., which is herein incorporated in its entirety by reference for all purposes.

TECHNICAL FIELD

The present disclosure relates to cloud computing environments, and more particularly to methods, techniques, and systems for embedding infrastructure security services into management nodes to form an embedded linked mode architecture.

BACKGROUND

In cloud computing environments, various centralized management services may exist to manage virtual machines and physical servers centrally in virtual computing environments. Virtual-machine technology may abstract the hardware resources and interfaces of a computer system on behalf of one or multiple virtual machines, each comprising one or more application programs and an operating system. The recent emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces. In such cloud computing environments, a cluster of management nodes running management services may be communicatively coupled together and act as a single platform for managing the virtualization infrastructure and deploying virtual machines. For example, two or more nodes may be grouped together provided that the functionality of the management nodes, as a whole, are able to act as a single platform for managing the virtualization infrastructure.

Figure 1A:
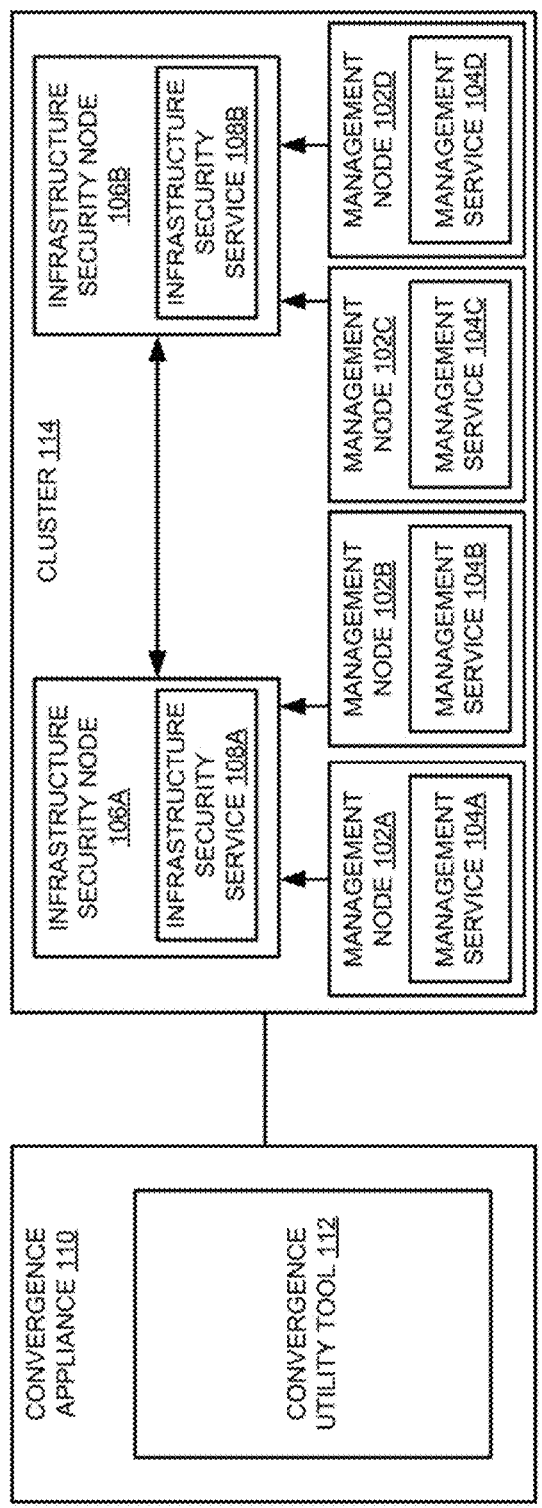
FIG. 1A is a block diagram of an example cloud computing environment, including a convergence utility tool to embed infrastructure security services into management nodes.

The drawings described herein are for illustration purposes only and are not intended to limit the scope of the present subject matter in any way.

DETAILED DESCRIPTION

Examples described herein may provide an enhanced computer-based and network-based method, technique, and system for embedding infrastructure security services into management nodes in a cloud computing environment (e.g., a customer production environment). The management nodes may execute centralized management services that may be interconnected to manage virtual machines (VMs) and physical servers centrally in virtual computing environments. In some systems with distributed management, the host computing systems may be statically allocated among the management nodes.

Further, infrastructure security services, such as a platform services controller (PSC) or federated single sign-on (SSO), may be connected to the management nodes and provide various infrastructure security functionalities for the centralized management services. Example infrastructure security functionality may include Single Sign-On, licensing, certificate management, server reservation, or the like. However, in such cases, users may have to separately manage additional nodes (e.g., VMs) that runs the infrastructure security services, which can be onerous. For example, users (e.g. virtual infrastructure (VI) architects) may prefer to have simple possible topology to support the requirements and may not prefer to manage any extra configuration items or VMs. Also, the connected products (i.e., the infrastructure security services and management nodes) may break interoperability.

A convergence utility (e.g., vCenter® External to Embedded Convergence Tool that is offered by VMware) may help customers to make a management node as an embedded node and sets up the infrastructure security services (e.g., PSC) replication for converged embedded node. The convergence utility is a command line interface (CLI) based and converges one management node to one embedded node in one go. Customers who have the requirement to use this convergence utility may have complex environments having several management nodes and the PSC nodes which the customers want to convert to embedded linked mode configuration architecture for simplification of management server configuration and elimination of PSC node management overhead.

However, the convergence utility may have to be run separately for each management node in sequence and hence consume a significant amount of time. The existing convergence utility may need to be provided with correct details of which node should be the replication partner for the node currently undergoing convergence. Further, users may not be able to decide on the resultant configuration topology (e.g., vCenter® embedded linked mode configuration architecture (VELMA)) for PSC replication because of variety of different possible configurations in the customer production environment. For example, there may be 10 management nodes and 2 PSC nodes or 4 management nodes with 3 PSC nodes connected in any topology, user may have PSC high availability or VCHA configurations with different combinations of PSC nodes and management nodes connectivity, or user may have several solutions configured with PSC node or management node. Also, users may have different versions of the product installed in a connected way which may lead to a situation where half of the configuration can be VELMA and hence may not be converged further.

Examples described herein may probe a cloud computing environment to detect an actual topology including connectivity between infrastructure security nodes and management nodes and generate a set of candidate topologies (e.g., a star topology, a linear topology, a ring topology, and the like) based on the actual topology. Each candidate topology may indicate a way to replicate the infrastructure security service (e.g., PSC) into the management nodes. Further, examples described herein may determine a replication partner associated with each of the management nodes based on a selection of one of the candidate topologies and execute an operation to deploy the infrastructure security service on the management nodes based on the selected one of the candidate topologies and the determined replication partners to form an embedded linked mode architecture.

Thus, examples described herein may enable customers to run the multiple convergence from one machine in one go rather than running for each management node. Customers can be saved from going to a wrong topology by running the convergence tool without considering final prestored configurations (e.g., VELMA). Examples described herein may notify any potential convergence issues in advance. Also, examples described herein may reduce customer issues or errors that may cause due to wrong usage of the convergence tool.

System Overview and Examples of Operation

FIG. 1A is a block diagram of an example cloud computing environment 100, including a convergence utility tool 112 to embed infrastructure security services 108A and 108B into management nodes 102A-102D. Example cloud computing environment 100 may be VMware vSphere®. Cloud computing environment 100 (e.g., a virtualized cloud computing environment) may include one or more computing platforms that support the creation, deployment, and management of virtual machine-based cloud applications. One such platform is the vCloud® Automation Center, which is commercially available from VMware.

As shown in FIG. 1A, cloud computing environment 100 may include a cluster 114 of management nodes 102A-102D executing a respective one of centralized management services 104A-104D, which can be dependent on each other. In one example, management nodes 102A-102D may be distributed across multiple sites (e.g., separate geographical locations). Each centralized management service 104A-104D may be a centralized management application to centrally manage virtual machines and physical servers in cloud computing environment 100. Example centralized management services 104A-104D may be a part of vCenter Server™ and vSphere® program products, which are commercially available from VMware. Example centralized management services may include virtual machine provisioning service (e.g., to guide and automate the provisioning of virtual machines and their resources), resources and virtual machine inventory management service (e.g., to organize virtual machines and resources in the virtual environment and facilitates their management), alarms and event management service (e.g., to track and warn users on potential resource overuse or event conditions), and the like.

Further, cloud computing environment 100 may include a plurality of infrastructure security nodes 106A and 106B externally connected to a corresponding ones of management nodes 102A-102D. Each of infrastructure security nodes 106A and 106B and management nodes 102A-102D may be selected from a group consisting of a physical host computing system, a virtual machine, and a container. In the example shown in FIG. 1A, two infrastructure security nodes 106A and 106B may be connected to four management nodes 102A-102D, however, cloud computing environment 100 may include any number of the infrastructure security nodes and the management nodes in any configuration.

Further, each infrastructure security node 106A and 106B may execute a corresponding infrastructure security service 108A and 108B to handle at least one infrastructure security function such as Single-Sign-On, license management, certificate management, and/or server reservation for corresponding centralized management services 104A-104D. For example, infrastructure security service 108A may include the license management function, which may deliver centralized license management and reporting functionality to management services in the production environment. Further, infrastructure security service 108B may be a replication of infrastructure security service 108A, and infrastructure security services 108A and 108B can be herein after referred to as infrastructure security service 108.

As shown in FIG. 1A, cloud computing environment 100 may include a convergence appliance 110 communicatively coupled to management nodes 102A-102D and infrastructure security nodes 106A and 106B via a network. Example network can be a managed Internet protocol (IP) network administered by a service provider. For example, the network may be implemented using wireless protocols and technologies, such as WiFi, WiMax, and the like. In other examples, the network can also be a packet-switched network such as a local area network, wide area network, metropolitan area network, Internet network, or other similar type of network environment. In yet other examples, the network may be a fixed wireless network, a wireless local area network (LAN), a wireless wide area network (WAN), a personal area network (PAN), a virtual private network (VPN), intranet or other suitable network system and includes equipment for receiving and transmitting signals.

Further, convergence appliance 110 may include convergence utility tool 112 to probe cloud computing environment 100 to detect an actual topology including connectivity between infrastructure security nodes 106A and 106B and management nodes 102A-102D. In one example, convergence utility tool 112 may detect the actual topology by:
  identifying infrastructure security nodes 106A and 106B in cloud computing environment 100,
  identifying actual replication partners associated with each of infrastructure security nodes 106A and 106B,
  determining management nodes 102A-102D registered to each of infrastructure security nodes 106A and 106B and the actual replication partners,
  determining workloads executing on each of management nodes 102A-102D, and
  performing topology construction to create the actual topology using determined infrastructure security nodes 106A and 106B, the actual replication partners, management nodes 102A-102D, and the workloads.

Furthermore, convergence utility tool 112 may generate a set of candidate topologies based on the actual topology. Each candidate topology may indicate a way to replicate infrastructure security service 108A or 108B into management nodes 102A-102D. In one example, the set of candidate topologies may include predefined candidate topologies and can be generated using predefined topology generating models. Each candidate topology may be a schematic description of a network arrangement, connecting various management nodes 102A-102D through lines of connection.

In one example, convergence utility tool 112 may generate the set of candidate topologies by categorizing management nodes 102A-102D based on at least one dynamic parameter (e.g., site, workload, supported features, versions, and/or the like) and generating, via a set of topology generating models, the set of candidate topologies from categorized management nodes 102A-102D based on the actual topology. For example, the set of candidate topologies may be selected from a group consisting of a linear topology, a ring topology, a chordal ring topology, a multidimensional chordal ring topology, a 2-dimensional or higher torus topology, a star topology, a hierarchical topology, and a mesh topology.

Also, convergence utility tool 112 may determine a replication partner associated with each of management nodes 102A-102D based on a selection of one of the candidate topologies. Convergence utility tool 112 may execute an operation to deploy infrastructure security service 108 on management nodes 102A-102D based on the selected one of the candidate topologies and the determined replication partners. In one example, convergence utility tool 112 may generate input information to execute the operation on each of management nodes 102A-102D using the determined replication partners. For example, generating input information may include generating input json files with configuration parameters to sequentially execute the operation on management nodes 102A-102D. For example, each input json file may include management node information and associated replication partner information. For a linear design, the replication partner may be the most recent management node that was converted into the embedded node. Convergence utility tool 112 may execute the input json files to sequentially perform the operation on management nodes 102A-102D.

Furthermore, convergence utility tool 112 may sequentially execute the operation on management nodes 102A-102D to deploy infrastructure security service 108 on management nodes 102A-102D based on the selection of one of the candidate topologies and the input information (e.g., json files) to form an embedded linked mode architecture. For example, the embedded linked mode architecture may refer to a linked mode of management nodes 102A-102D with embedded infrastructure security services 152A-152D (e.g., as shown in FIG. 1B).

Figure 1B:
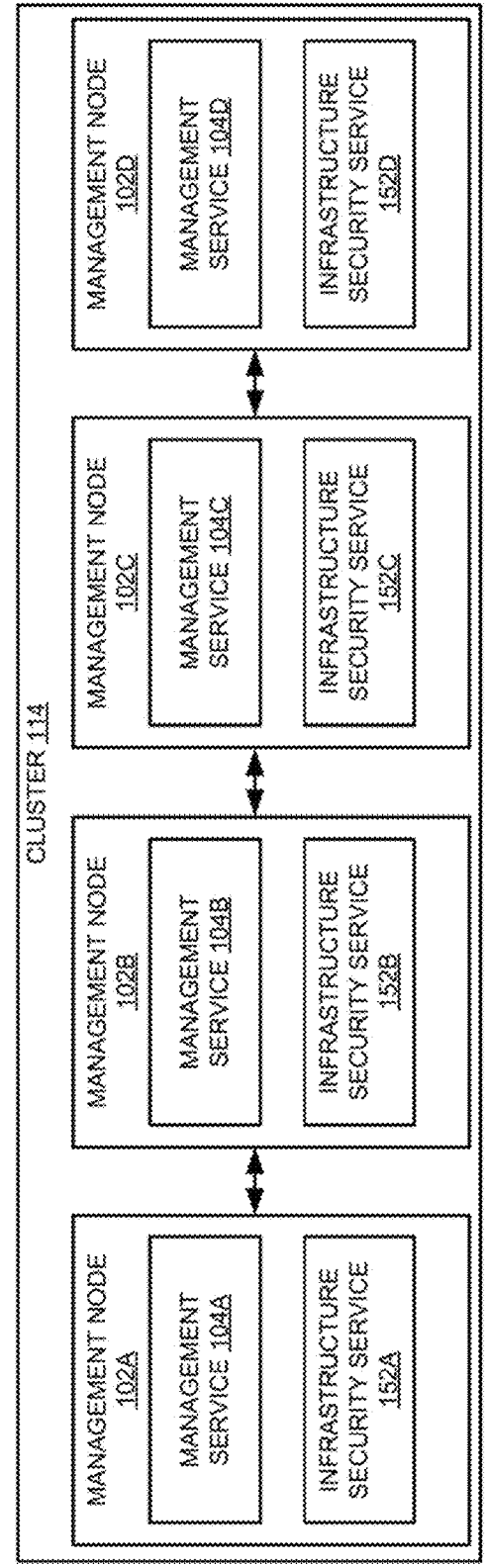
FIG. 1B is a block diagram of the example cloud computing environment of FIG. 1, depicting an embedded linked mode architecture.

In one example, sequentially executing the operation on management nodes 102A-102D to deploy infrastructure security service 108 on management nodes 102A-102D may include:
 identifying a first management node (e.g., 102A) in the selected one of the candidate topologies.
 deploying a first infrastructure security service (e.g., 152A as shown in FIG. 1B) on first management node 102A. In this example, an existing infrastructure security service (e.g., 108A) is set as a replication partner of first infrastructure security service 152A.
 replicating data in existing infrastructure security service 108A to first infrastructure security service 152A.
 reconfiguring first infrastructure security service 152A and repointing first management node 102A to first infrastructure security service 152A such that first infrastructure security service 152A may operate with first management node 102A.
 repeating the steps of selecting, deploying, replicating, reconfiguring, and repointing for a next management node (e.g., 102B) in the selected one of the candidate topologies based on the determined replication partner (e.g., 102A in the example shown in FIG. 1B) for next management node 102B until all management nodes 102A-102D in cloud computing environment 100 join the embedded linked mode architecture. Sequentially executing the operation on management nodes is explained in detail with respect to FIGS. 2A-2E and 4A-4H.

Furthermore, convergence utility tool 112 may decommission infrastructure security nodes 106A and 106B upon deploying infrastructure security service 108 into management nodes 102A-102D. Thus, users may not have to separately manage additional infrastructure security nodes 106A and 106B (e.g., VMs) that runs infrastructure security services 108A and 108B, respectively. FIG. 1B is a block diagram of example cloud computing environment 100, depicting embedded linked mode architecture (e.g., a linear topology). The embedded linked mode architecture may include a linked mode of management nodes 102A-102D with embedded infrastructure security services 152A-152D, respectively.

Example embedded linked mode architecture may be include vCenter® embedded linked mode architecture (VELMA). VELMA may refer to an enhanced linked mode support for management nodes 102A-102D (e.g., vCenter® Server Appliances) with embedded infrastructure security services 152A-152D (e.g., embedded PSCs), respectively. With VELMA, management nodes 102A-102D with embedded infrastructure security services 152A-152D may be connected together to form a domain (e.g., Single-Sign-On domain). In other words, management nodes 102A-102D can be linked together using VELMA and displayed in a single inventory view, which enables to manage all management services 104A-104D which are linked together within the same domain.

In some examples, the functionalities described herein, in relation to instructions to implement functions of convergence utility tool 112, and any additional instructions described herein in relation to the storage medium, may be implemented as engines or modules comprising any combination of hardware and programming to implement the functionalities of the modules or engines described herein. The functions of convergence utility tool 112 may also be implemented by a respective processor. In examples described herein, the processor may include, for example, one processor or multiple processors included in a single device or distributed across multiple devices. In some examples, convergence utility tool 112 can be a part of management software (e.g., vSphere® virtual center that is offered by VMware®) residing in a management node (e.g., 102).

Figure 2A:
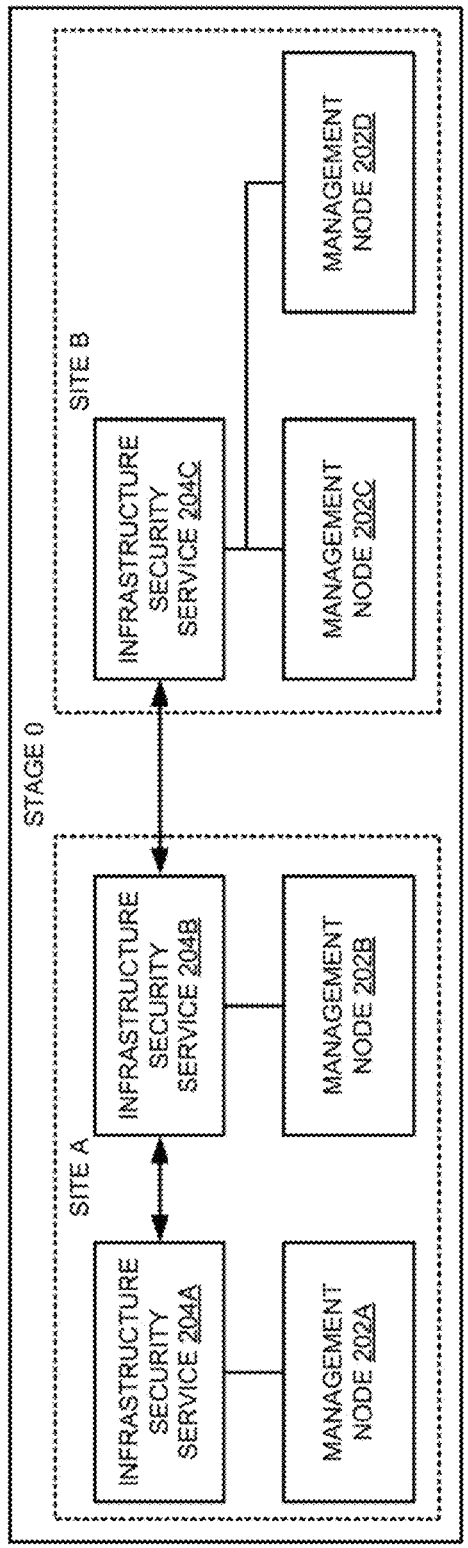
FIGS. 2A-2E illustrate example sequence diagrams, illustrating embedding infrastructure security services into management nodes in a linear topology to form an embedded linked mode configuration architecture.
Figure 2B:
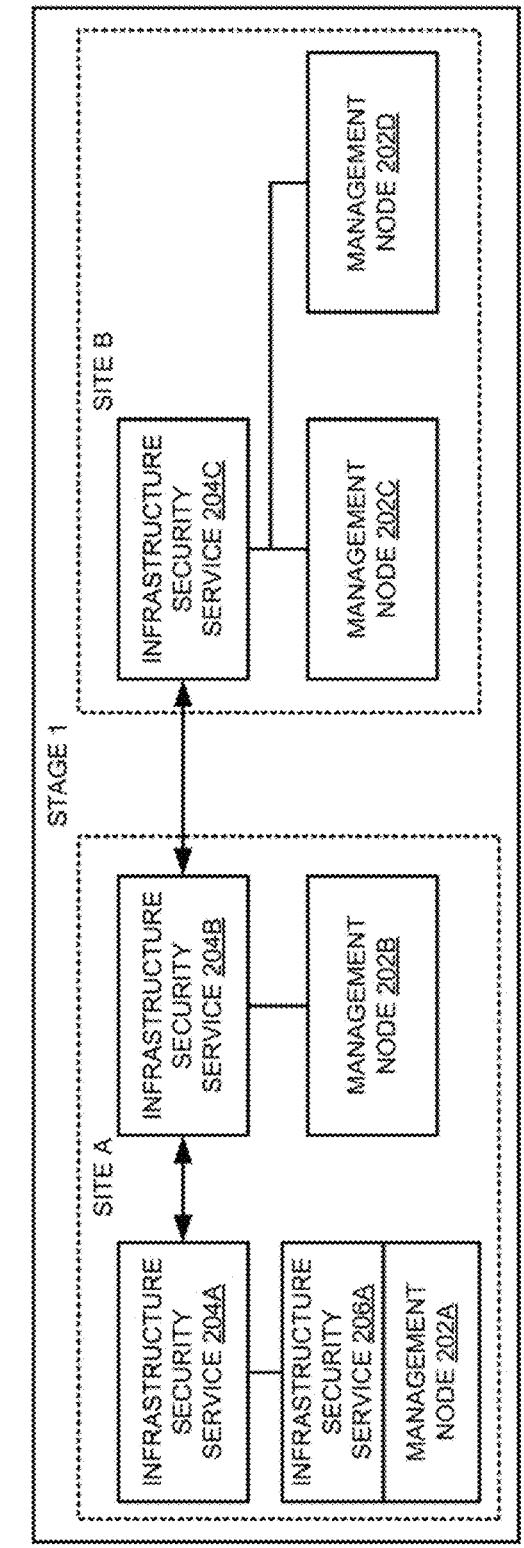
Figure 2C:
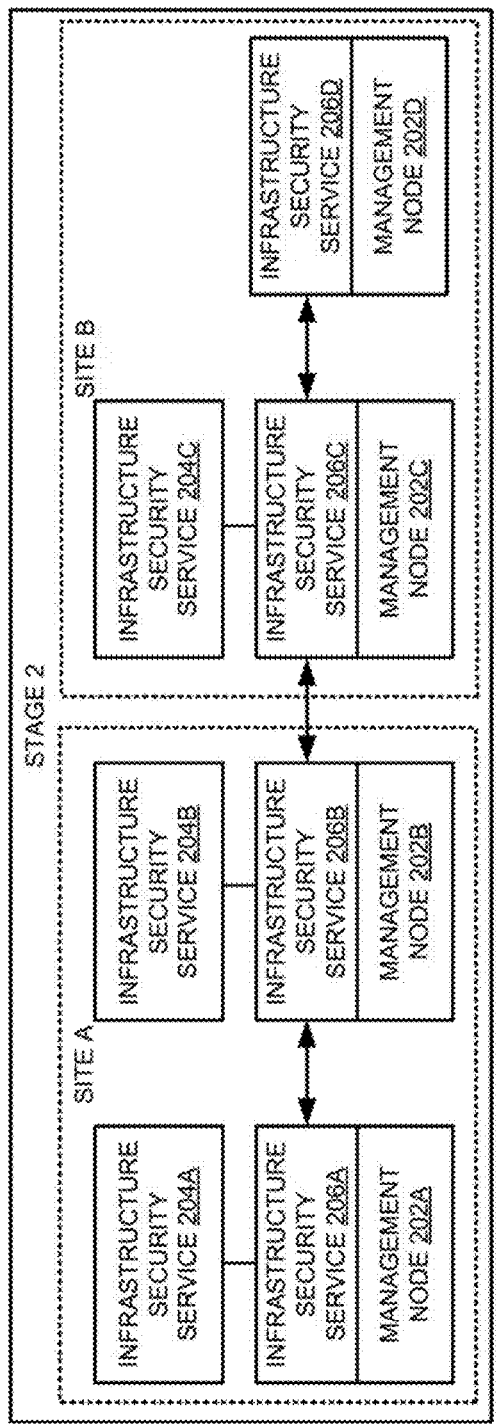
Figure 2D:
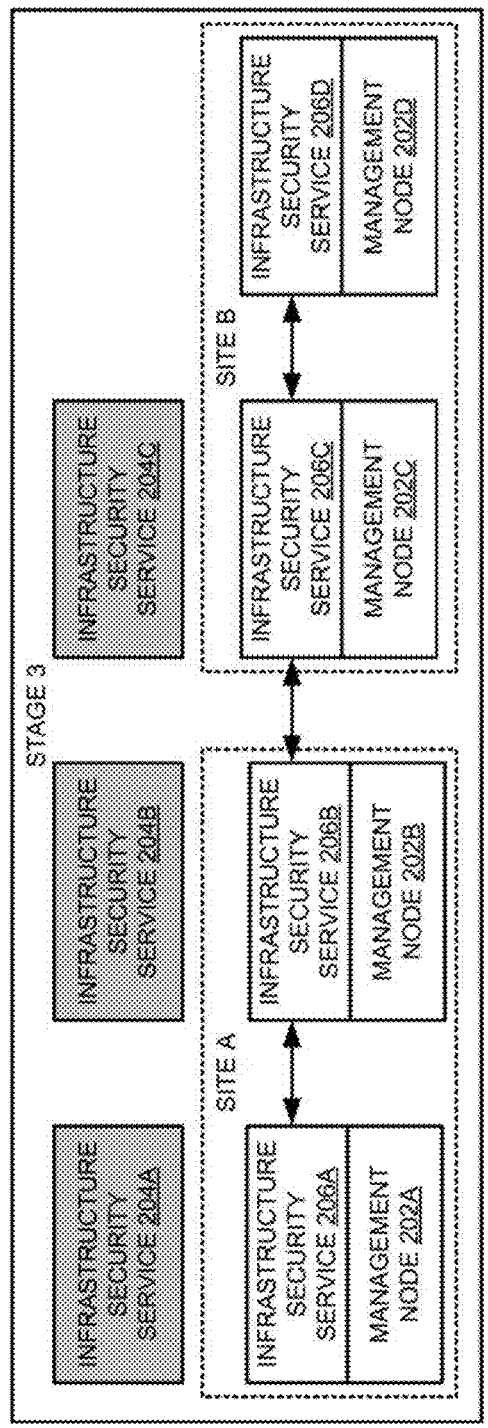
Figure 2E:
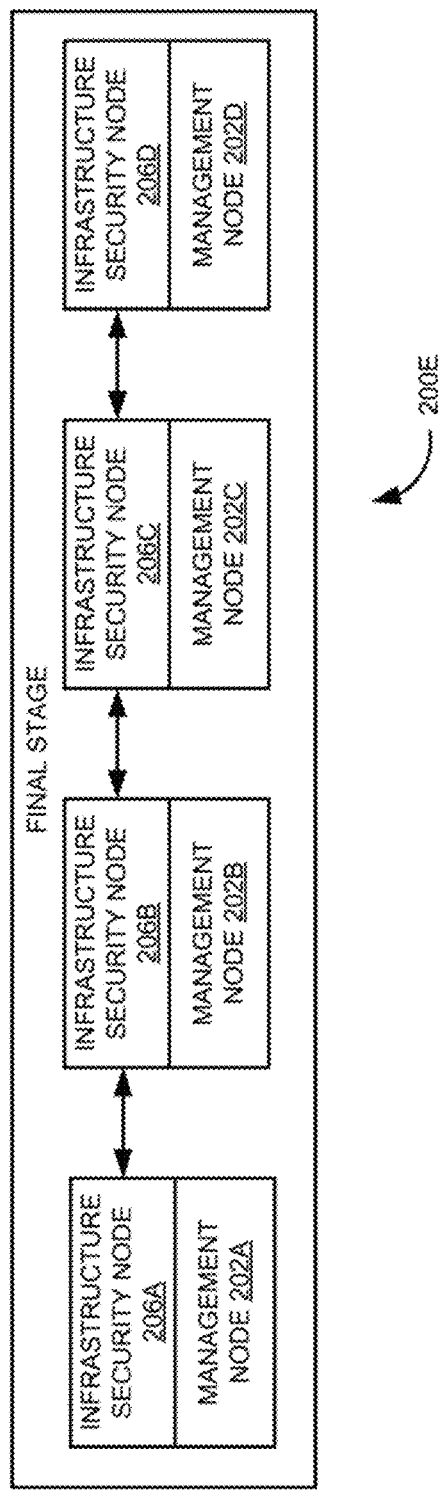

FIGS. 2A-2E illustrate example sequence diagrams 200A-200E, respectively, illustrating embedding infrastructure security services 204A-204C into management nodes 202A-202D in a linear topology to form an embedded linked mode configuration architecture. Infrastructure security services 204A-204C may be running on separate nodes and are externally connected to respective ones of management nodes 202A-202D. A convergence utility tool (e.g., 112 as shown in FIG. 1A) may be used to convert management nodes 202A-202D with external infrastructure security services 204A-204C to management nodes 202A-202D with embedded infrastructure security services 206A-206D, respectively (e.g., as shown in FIG. 2E).

As shown in FIG. 2A, stage 0 may represent two sites (e.g., site A and site B) that includes management nodes 202A-202D with at least one external infrastructure security services 204A-204C. Management nodes 202A-202D may be connected by a linked mode.

Consider that a linear topology (i.e., a candidate topology) may be selected by a customer for replicating infrastructure security service 204 into management nodes 202A-202D. In this example, an infrastructure security service 204A is set as a replication partner of management node 202A, management node 202A is set as a replication partner of management node 202B, management node 202B is set as a replication partner of management node 202C, and management node 202C is set as a replication partner of management node 202D.

Further, the convergence utility tool may sequentially execute the operation on management nodes 202A-202D to deploy infrastructure security service 204 on management nodes 202A-202D as shown in FIGS. 2B to 2E. As shown in FIG. 2B, stage 1 depicts site A that is reconfigured as management node 202A with an embedded infrastructure security service 206A. In this example, the convergence utility tool may identify management node 202A in the selected linear topology, deploy infrastructure security service 206A on management node 202A, and enable to replicate data in infrastructure security service 204A (i.e., replication partner) to infrastructure security service 206A.

As shown in stage 2 of FIG. 2C, once site A is reconfigured with management node 202A with embedded infrastructure security service 206A, then the convergence utility tool may reconfigure management node 202B with an embedded infrastructure security service 206B, connecting management node 202B to management node 202A. In this example, the convergence utility tool may identify management node 202B (i.e., as a next node) in the selected linear topology, deploy infrastructure security service 206B on management node 202B, and enable to replicate data in infrastructure security service 206A of management node 202A to infrastructure security service 206B (i.e., management node 202A is the replication partner of management node 202B). Similarly, site B can be sequentially reconfigured as management nodes 202C and 202D with embedded infrastructure security services 206C and 206D, respectively, using associated replication partners and the selected linear topology. As shown in FIG. 2C, infrastructure security service 206C may be linked to infrastructure security service 206B, and infrastructure security service 206D may be linked to infrastructure security service 206C with embedded linked mode. Thus, customers can run the multiple convergence from one machine in one go rather than running for each management node.

As shown in stage 3 of FIG. 2D, with all management nodes 202A-202D running with embedded infrastructure security services 206A-206D, respectively, the convergence utility tool may evaluate the external infrastructure security services nodes that remain to ensure that no components/management services are using them as identity providers such as, for instance, site recovery manager, vSphere® Replication, or vRealize® Operations. If any management node (e.g., any management service) is using the external infrastructure security services, reconfigure them to use the newly embedded infrastructure security services 206A-206D. With management nodes 202A-202D in the cloud computing system now participating in the embedded linked mode, the external infrastructure security services 204A-204C can be decommissioned. FIG. 2E depicts an embedded linked mode configuration architecture (e.g., final stage) having management nodes 202A-202D with associated embedded infrastructure security services 206A-206D upon decommissioning external infrastructure security services 204A-204C. Even though FIGS. 2A-2E describe about a linear topology to form the embedded linked mode configuration architecture, examples described herein can also be used to deploy/embed an infrastructure security service on management nodes in any other selected topology such as a ring topology as shown in FIGS. 3A and 3B.

Figure 3A:
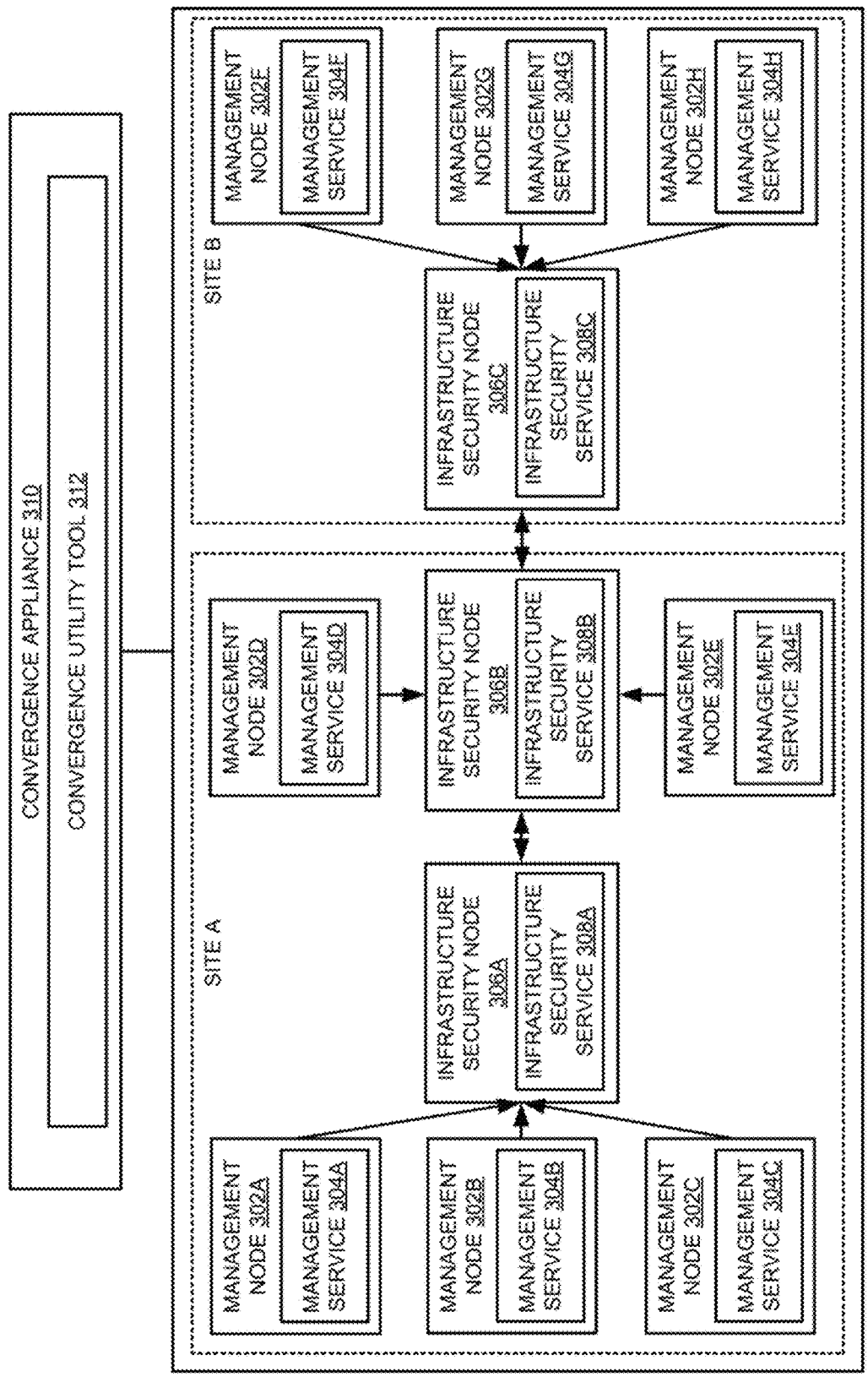
FIGS. 3A and 3B illustrate other example block diagrams of an example cloud computing environment, including a convergence utility tool to embed infrastructure security services into management nodes in a ring topology.
Figure 3B:
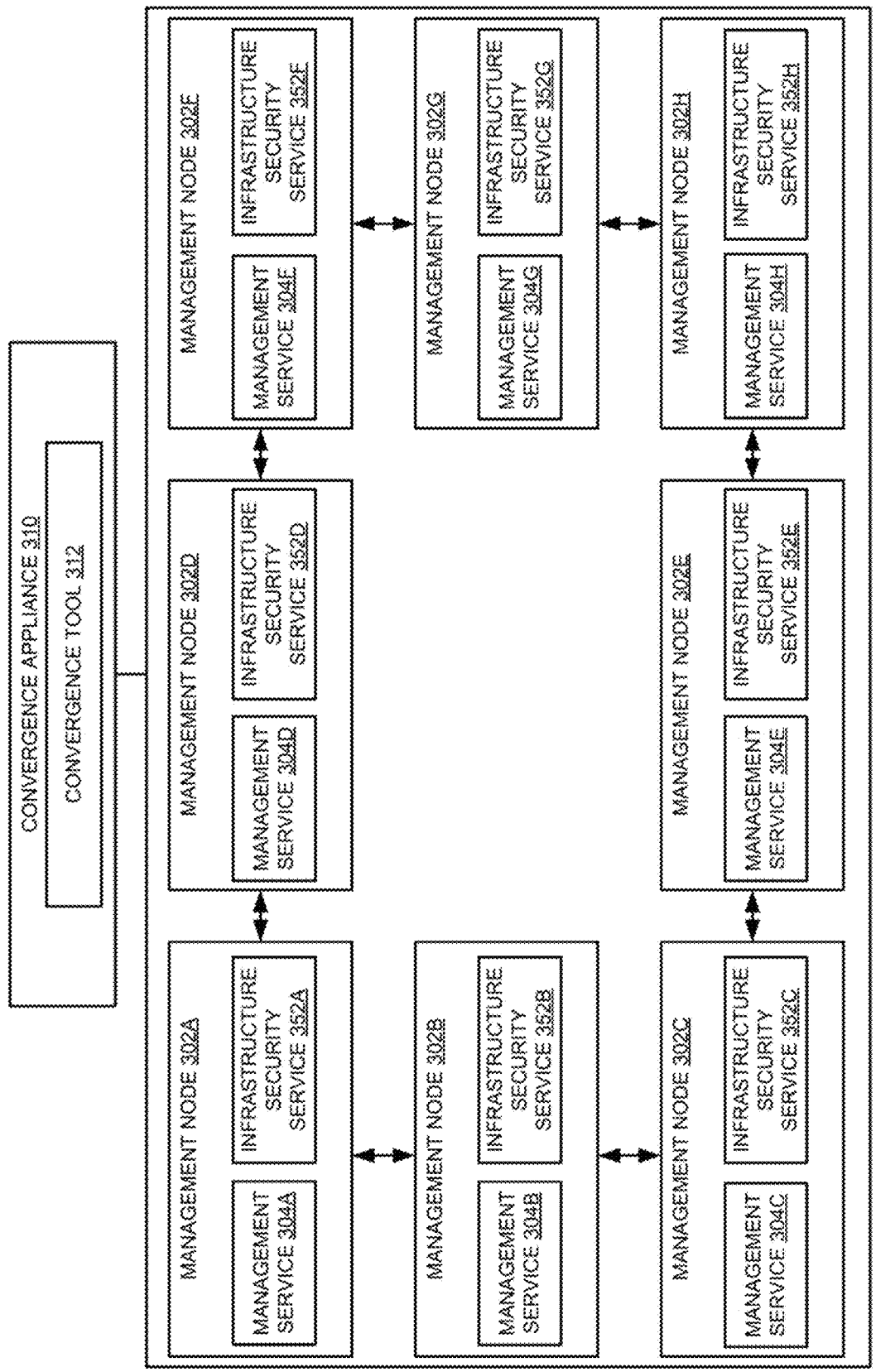

FIGS. 3A and 3B illustrate other example block diagrams of an example cloud computing environment 300, including a convergence utility tool 312 to embed infrastructure security services 308A-308C into management nodes 302A-302H in a ring topology. In the example shown in FIG. 3A, infrastructure security services 308A-308C may be running on separate infrastructure security nodes 306A-306C and are externally connected to respective ones of management nodes 302A-302H that are distributed across site A and site B. Management nodes 302A-302H may be executing respective management services 304A-304H. A convergence utility tool 312 running in a convergence appliance 310 may sequentially execute an operation (e.g., using json files) to convert management nodes 302A-302H with external infrastructure security services 308A-308C to management nodes 302A-302H with embedded infrastructure security services 352A-352H, respectively (e.g., as shown in FIG. 3B) based on the selected ring topology and replication partner information. FIG. 3B depicts an embedded linked mode configuration architecture having management nodes 302A-302H with associated embedded infrastructure security services 352A-352H in the selected ring topology upon decommissioning external infrastructure security nodes 306A-306C.

FIGS. 4A-4H illustrate other example sequence diagrams, illustrating sequentially embedding an infrastructure security service 402 into a pair of management nodes 404A and 404B to form an embedded linked mode configuration architecture. As shown in 400A of FIG. 4A, management nodes 404A and 404B may be provided with an external infrastructure security service 402. Further, upon receiving a request to convert management nodes 404A and 404B with external infrastructure security service 402 to management nodes 404A and 404B with embedded infrastructure security services, a convergence utility tool 408 executing on a convergence appliance 406 may be deployed in the customer production environment (e.g., as shown in 400B of FIG. 4B).

Further, convergence utility tool 408 may generate a set of candidate topologies and enable a user to select a topology from the set of candidate topologies. Furthermore, convergence utility tool 408 may sequentially execute the operation on management nodes 404A and 404B to deploy infrastructure security service 402 on management nodes 404A and 404B based on the selected topology.

Figure 4A:
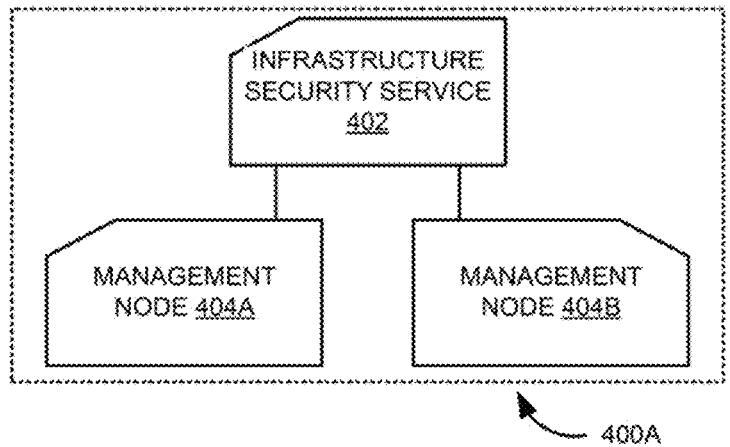
FIGS. 4A-4H illustrate other example sequence diagrams, illustrating embedding infrastructure security services into a pair of management nodes to form an embedded linked mode configuration architecture.
Figure 4B:
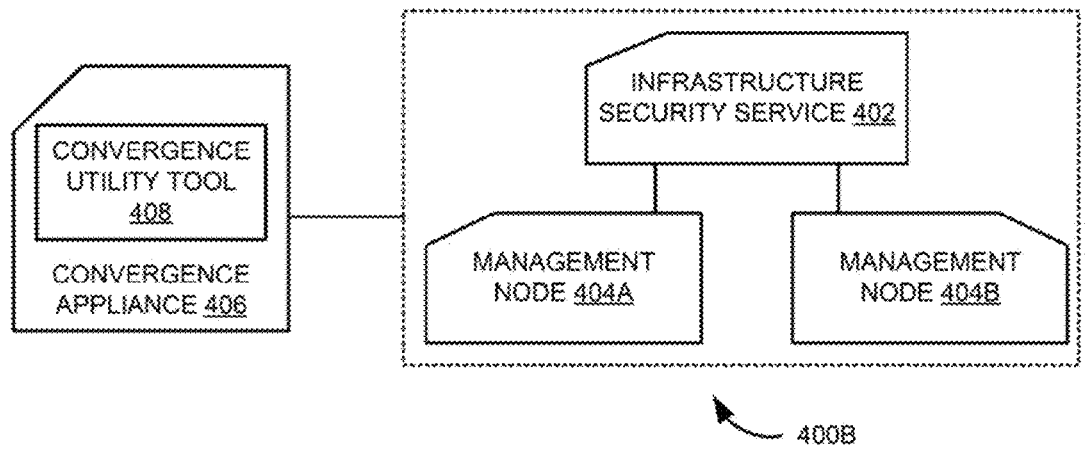
Figure 4C:
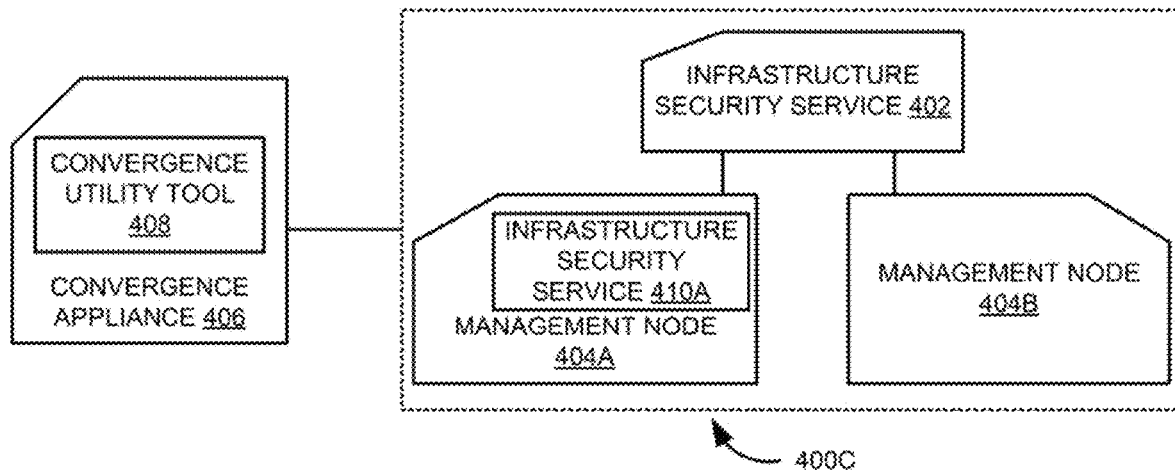
Figure 4D:
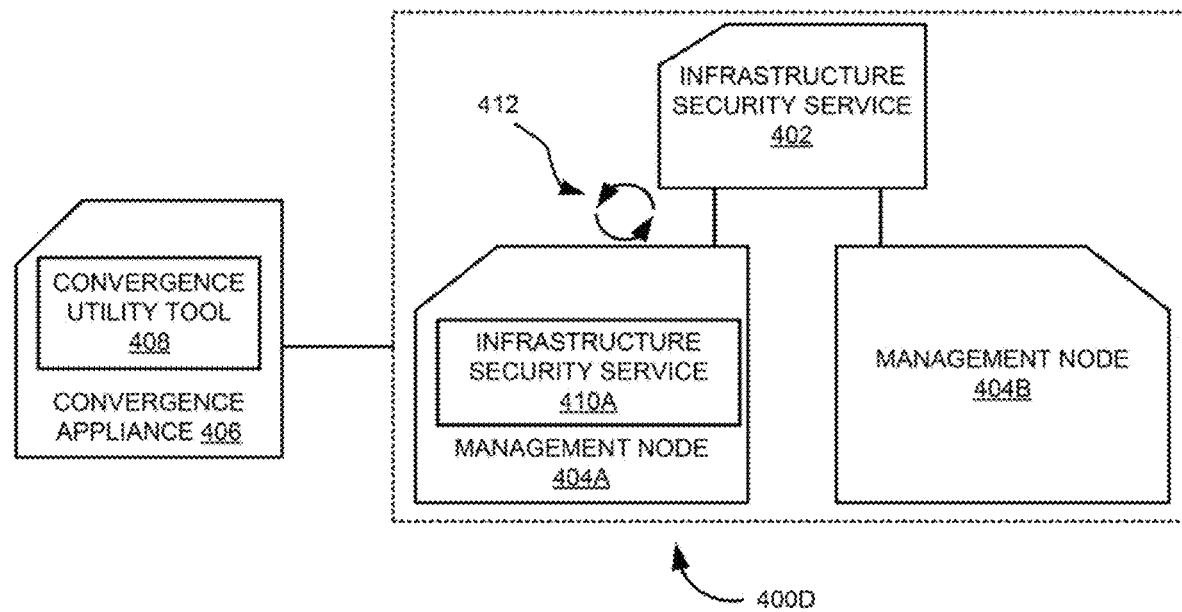

In one example, convergence utility tool 408 may identify a first management node 404A in the selected topology and deploy infrastructure security service 410A on first management node 404A (e.g., as shown in 400C of FIG. 4C). In this example, infrastructure security service 402 may be set as the replication partner of infrastructure security service 410A. Further, data in infrastructure security service 402 may be replicated to infrastructure security service 410A as shown by arrow 412 in 400D of FIG. 4D.

Figure 4E:
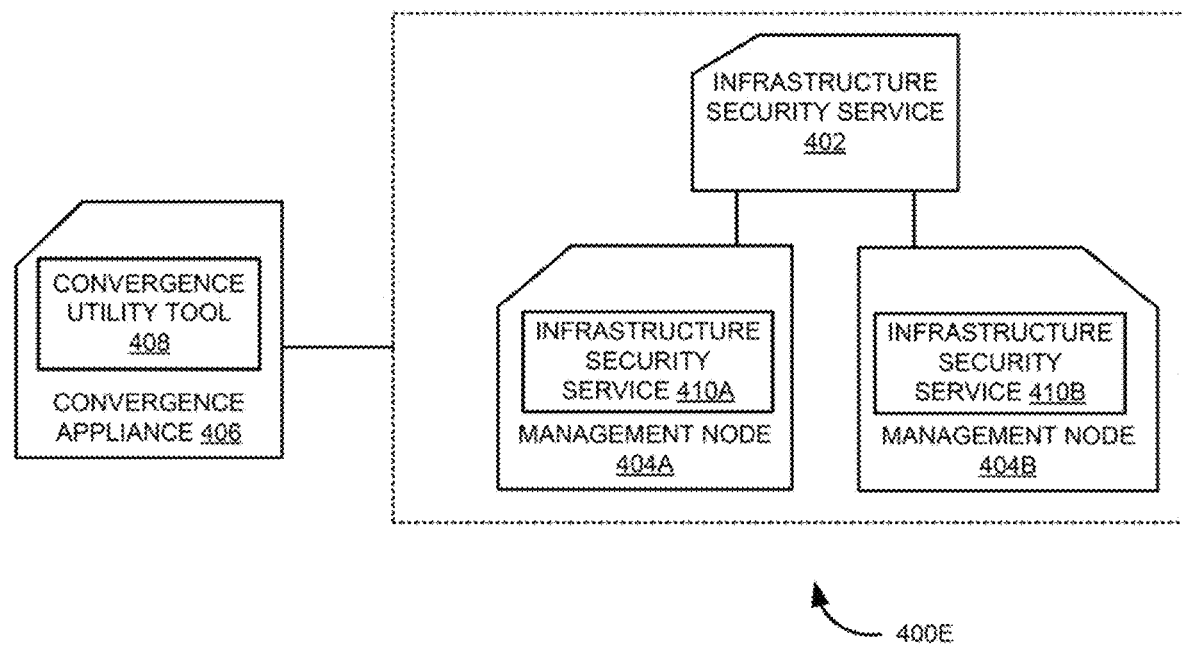
Figure 4F:
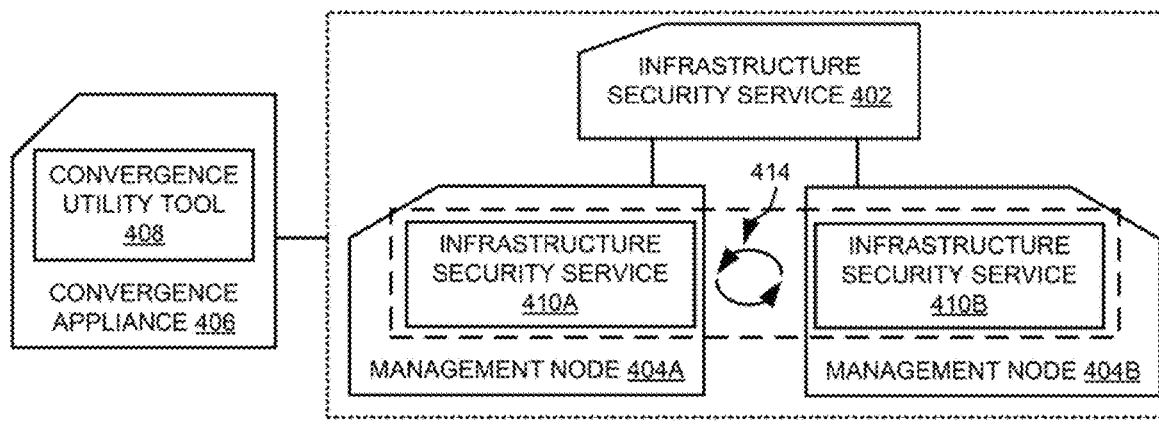
Figure 4G:
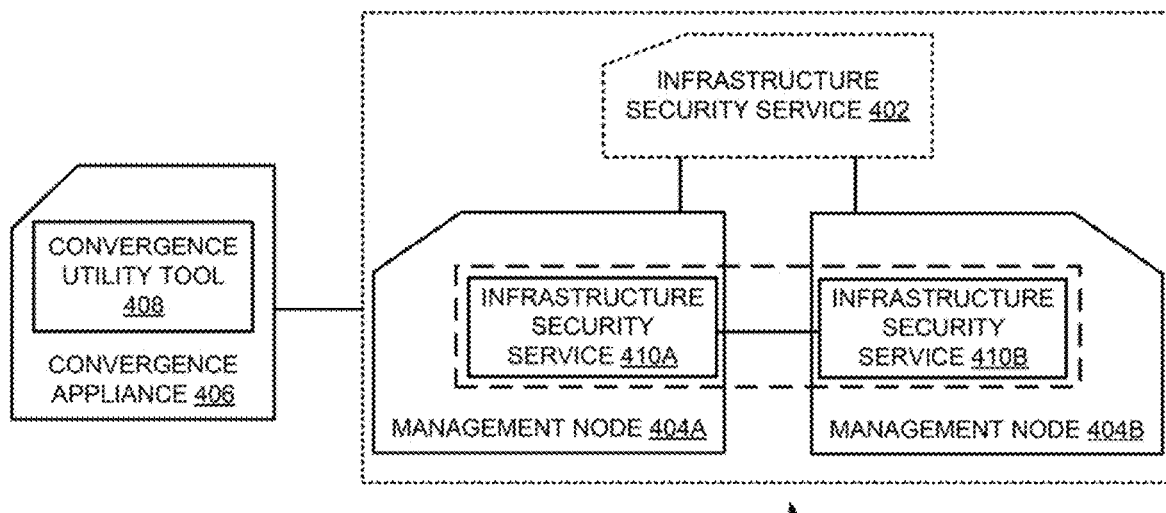
Figure 4H:
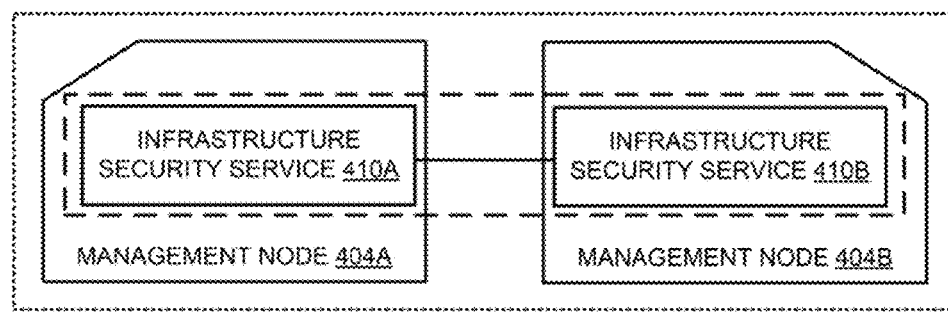

Furthermore, convergence utility tool 408 may identify a second management node 404B in the selected topology and deploy infrastructure security service 410B on second management node 404B (e.g., as shown in 400E of FIG. 4E). In this example, infrastructure security service 410A may be set as the replication partner of infrastructure security service 410B. Further, data in infrastructure security service 410A may be replicated to infrastructure security service 410B as shown by arrow 414 in 400F of FIG. 4F. Convergence utility tool 408 may decommission node that runs external infrastructure security service 402 upon deploying the infrastructure security service 402 into management nodes 404A and 404B (e.g., as shown in 400G of FIG. 4G). FIG. 4H depicts an embedded linked mode configuration architecture (e.g., 400H) having management nodes 404A and 404B with associated embedded infrastructure security services 410A and 410B upon decommissioning external infrastructure security service 402.

Example Processes

Figure 5:
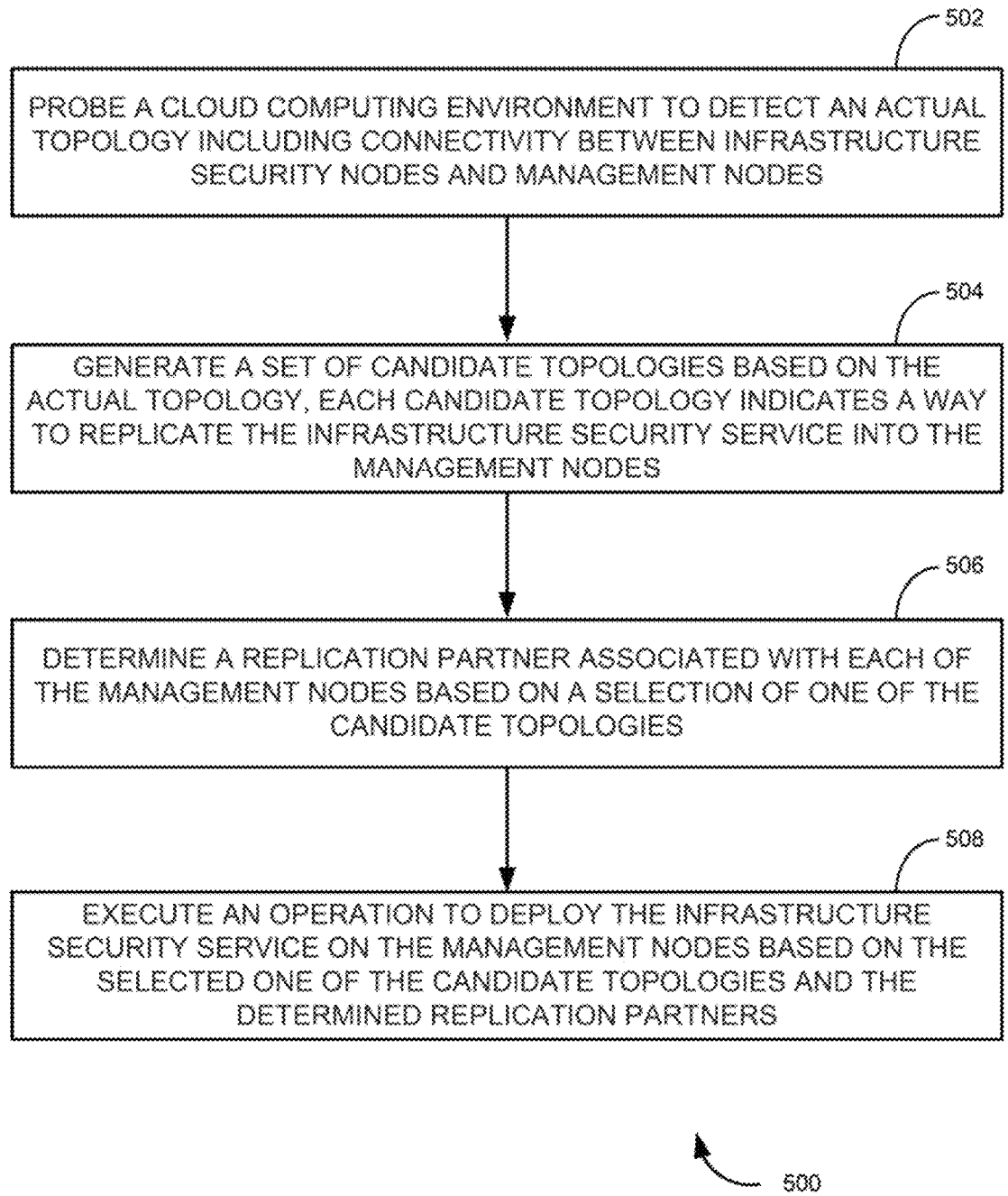
FIG. 5 is an example flow diagram illustrating embedding infrastructure security services into management nodes to form an embedded linked mode configuration architecture.

FIG. 5 is an example flow diagram 500 illustrating embedding infrastructure security services into management nodes to form an embedded linked mode configuration architecture. It should be understood that the process depicted in FIG. 5 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 502, a cloud computing environment may be probed to detect an actual topology including connectivity between the infrastructure security nodes and the management nodes. Each management node may execute a corresponding centralized management service. Each infrastructure security node may execute a corresponding infrastructure security service that handles at least one infrastructure security function.

At 504, a set of candidate topologies may be generated based on the actual topology. Each candidate topology may indicate a way to replicate the infrastructure security service into the management nodes.

At 506, a replication partner associated with each of the management nodes may be determined based on a selection of one of the candidate topologies. At 508, an operation may be executed to deploy the infrastructure security service on the management nodes based on the selected one of the candidate topologies and the determined replication partners to form an embedded linked mode architecture.

In one example, executing the operation to deploy the infrastructure security service on the management nodes may include generating input information to execute the operation on each of the management nodes using the determined replication partners and sequentially executing the operation, via a convergence utility tool, on the management nodes to deploy the infrastructure security service on the management nodes based on the selection of one of the candidate topologies and the input information to form the embedded linked mode architecture. An example for sequentially executing the operation is explained in FIG. 6.

Figure 6:
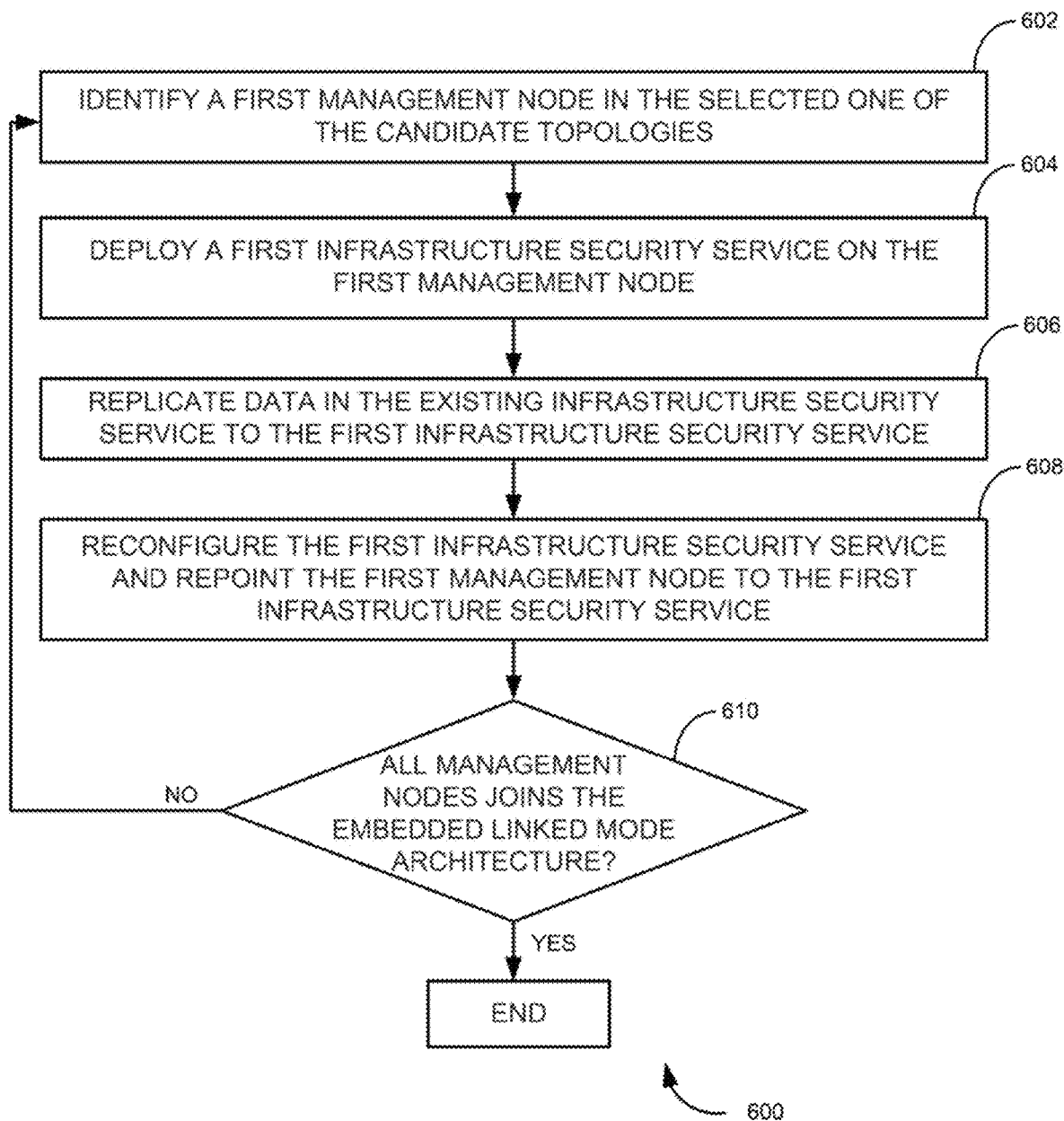
FIG. 6 is an example flow diagram illustrating sequentially executing an operation on the management nodes to deploy the infrastructure security service on the management nodes.

FIG. 6 is an example flow diagram 600 illustrating sequentially executing the operation on the management nodes to deploy the infrastructure security service on the management nodes. At 602, a first management node may be identified in the selected one of the candidate topologies. At 604, a first infrastructure security service may be deployed on the first management node. In one example, an existing infrastructure security service is set as a replication partner of the first infrastructure security service.

At 606, data in the existing infrastructure security service may be replicated to the first infrastructure security service. At 608, the first infrastructure security service may be reconfigured and the first management node may be repointed to the first infrastructure security service such that the first infrastructure security service is to operate with the first management node.

At 610, a check is made to determine whether all the management nodes in the cloud computing environment joins the embedded linked mode architecture. The process 600 goes to block 602 and repeats the blocks 602-610 (i.e., selecting, deploying, replicating, reconfiguring, and repointing) for a next management node in the selected one of the candidate topologies based on the determined replication partner for the next management node until all the management nodes in the cloud computing environment joins the embedded linked mode architecture. Upon deploying the infrastructure security service into all the management nodes, the infrastructure security nodes can be decommissioned.

Figure 7:
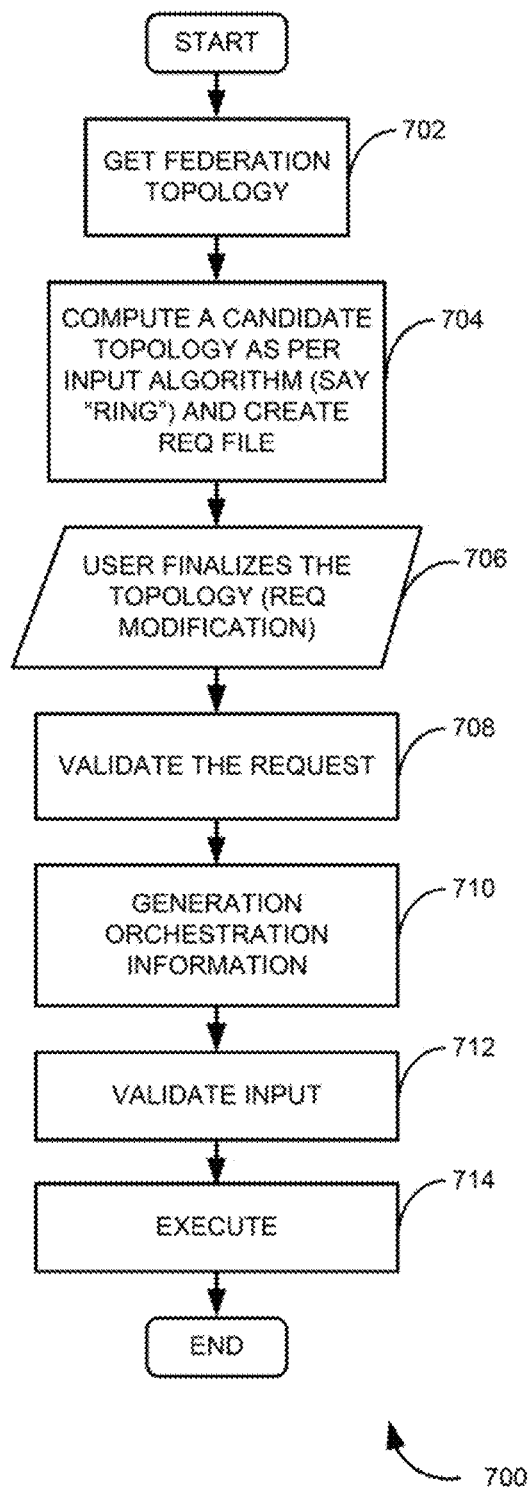
FIG. 7 is another example flow diagram illustrating additional features for embedding infrastructure security services into management nodes.

FIG. 7 is another example flow diagram 700 illustrating additional features for embedding infrastructure security services into management nodes. At 702, a federation topology including management nodes and external infrastructure security nodes may be obtained. At 704, a candidate topology (say "ring") may be computed as per a topology generation algorithm and a request file may be created. At 706, the candidate topology may be finalized by a user via requesting any needed modifications.

At 708, the request for modifications may be validated (i.e., the selection of the candidate topology may be validated). At 710, orchestration information with configuration parameters may be generated based on the finalized candidate topology and replication partners. At 712, the input orchestration information may be validated. At 714, the input orchestration information may be executed to sequentially deploy the infrastructure security service on the management nodes.

Figure 8:
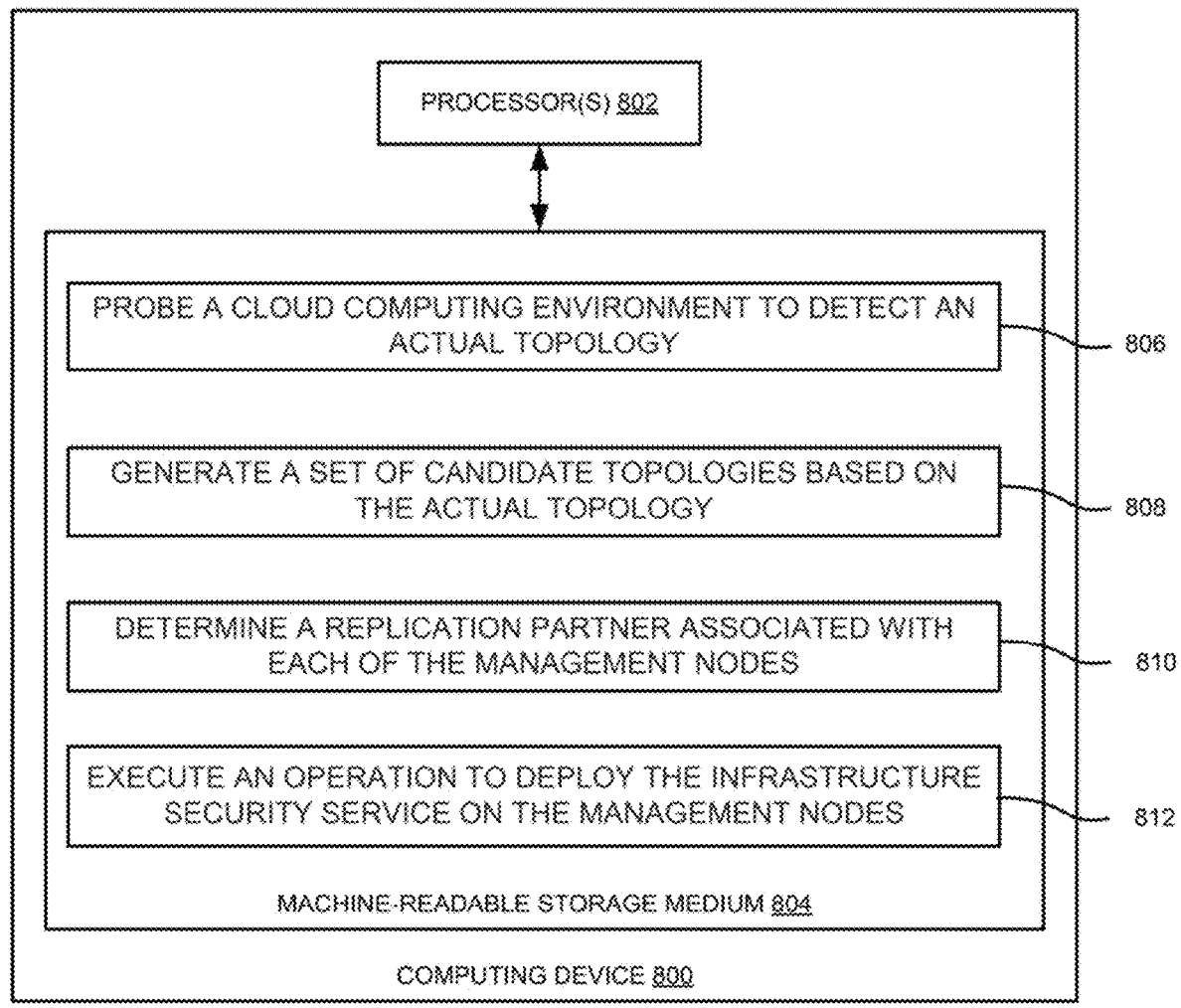
FIG. 8 is a block diagram of an example computing device including non-transitory computer-readable storage medium storing instructions to embed infrastructure security services into management nodes to form an embedded linked mode configuration architecture.

FIG. 8 is a block diagram of an example computing device 800 including non-transitory machine-readable storage medium 804 storing instructions to embed infrastructure security services into management nodes to form an embedded linked mode configuration architecture. Computing device 800 may include a processor 802 and machine-readable storage medium 804 communicatively coupled through a system bus. Processor 802 may be any type of central processing unit (CPU), microprocessor, or processing logic that interprets and executes machine-readable instructions stored in machine-readable storage medium 804. Machine-readable storage medium 804 may be a random-access memory (RAM) or another type of dynamic storage device that may store information and machine-readable instructions that may be executed by processor 802. For example, machine-readable storage medium 804 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 804 may be a non-transitory machine-readable medium. In an example, machine-readable storage medium 804 may be remote but accessible to computing system 800.

Machine-readable storage medium 804 may store instructions 806-812. In an example, instructions 806-812 may be executed by processor 802 for forming the embedded linked mode configuration architecture. Instructions 806 may be executed by processor 802 to probe a cloud computing environment to detect an actual topology including connectivity between infrastructure security nodes and management nodes. Instructions 808 may be executed by processor 802 to generate a set of candidate topologies based on the actual topology, each candidate topology indicates a way to replicate the infrastructure security service into the management nodes. Further, instructions 810 may be executed by processor 802 to determine a replication partner associated with each management node based on a selection of one of the candidate topologies. In addition, instructions 812 may be executed by processor 802 to execute an operation to deploy the infrastructure security service on the management nodes based on the selected one of the candidate topologies and the determined replication partners to form an embedded linked mode architecture.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

Examples described in FIGS. 1-8 can be implemented in vCenter Server™ and vSphere® program products, which are commercially available from VMware. Examples described herein can also be implemented in vRealize Automation®, vRealize Operations, vRealize Business, vCloud Automation Center, and/or the like that are offered by VMware.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
    probing a cloud computing environment to detect an actual topology including connectivity between infrastructure security nodes and management nodes, wherein each management node is to execute a corresponding centralized management service and each infrastructure security node is to execute a corresponding infrastructure security service that handles at least one infrastructure security function;
    generating a set of candidate topologies based on the actual topology, each candidate topology indicates a way to replicate the infrastructure security service into the management nodes;
    determining a replication partner associated with each of the management nodes based on a selection of one of the candidate topologies; and
    executing an operation to deploy the infrastructure security service on the management nodes based on the selected one of the candidate topologies and the determined replication partners to form an embedded linked mode architecture.

2. The method of claim 1, further comprising:
    decommissioning the infrastructure security nodes upon deploying the infrastructure security service into the management nodes.

3. The method of claim 1, wherein probing the cloud computing environment to detect the actual topology comprises:
    identifying the infrastructure security nodes in the cloud computing environment;
    identifying actual replication partners associated with each of the infrastructure security nodes;
    determining the management nodes registered to each of the infrastructure security nodes and the actual replication partners;
    determining workloads executing on each of the management nodes; and
    performing topology construction to create the actual topology using the determined infrastructure security nodes, the actual replication partners, the management nodes, and the workloads.

4. The method of claim 1, wherein generating the set of candidate topologies based on the actual topology comprises:
    categorizing the management nodes based on at least one dynamic parameter; and
    generating, via a set of topology generating models, the set of candidate topologies from the categorized management nodes based on the actual topology.

5. The method of claim 1, wherein executing the operation to deploy the infrastructure security service on the management nodes comprises:

generating input information to execute the operation on each of the management nodes using the determined replication partners; and sequentially executing the operation on the management nodes to deploy the infrastructure security service on the management nodes based on the selection of one of the candidate topologies and the input information to form the embedded linked mode architecture.

6. The method of claim 5, wherein sequentially executing the operation on the management nodes to deploy the infrastructure security service on the management nodes comprises:

identifying a first management node in the selected one of the candidate topologies;

deploying a first infrastructure security service on the first management node, wherein an existing infrastructure security service is set as a replication partner of the first infrastructure security service;

replicating data in the existing infrastructure security service to the first infrastructure security service;

reconfiguring the first infrastructure security service and repointing the first management node to the first infrastructure security service such that the first infrastructure security service is to operate with the first management node; and repeating the steps of selecting, deploying, replicating, reconfiguring, and repointing for a next management node in the selected one of the candidate topologies based on the determined replication partner for the next management node until all the management nodes in the cloud computing environment joins the embedded linked mode architecture.

7. The method of claim 5, wherein generating the input information comprises:

generating input json files with configuration parameters to sequentially execute the operation on the management nodes.

8. The method of claim 1, wherein each infrastructure security service is to handle the at least one infrastructure security function for a corresponding management service, wherein the at least one infrastructure security function is selected from a group consisting of Single-Sign-On, license management, certificate management, and server reservation, and wherein each centralized management service is a centralized management application to centrally manage virtual machines and physical servers in the cloud computing environment.

9. The method of claim 1, wherein each of the infrastructure security nodes and the management nodes is selected from a group consisting of a physical host computing system, a virtual machine, and a container.

10. The method of claim 1, wherein the set of candidate topologies may be selected from a group consisting of a linear topology, a ring topology, a chordal ring topology, a multidimensional chordal ring topology, a 2-dimensional or higher torus topology, a star topology, a hierarchical topology, and a mesh topology.

11. A system comprising:

a plurality of management nodes, each executing a centralized management service;

a plurality of infrastructure security nodes externally connected to a corresponding one of the management nodes, each infrastructure security node executing an infrastructure security service; and a convergence appliance connected to the management nodes and the infrastructure security nodes, the convergence appliance comprises a processor and memory coupled to the processor, and wherein the memory comprises a convergence utility tool to:

probe a cloud computing environment to detect an actual topology including connectivity between the infrastructure security nodes and the management nodes;

generate a set of candidate topologies based on the actual topology, each candidate topology indicates a way to replicate the infrastructure security service into the management nodes;

determine a replication partner associated with each of the management nodes based on a selection of one of the candidate topologies; and execute an operation to deploy the infrastructure security service on the management nodes based on the selected one of the candidate topologies and the determined replication partners.

12. The system of claim 11, wherein the convergence utility tool is to:

decommission the plurality of infrastructure security nodes upon deploying the infrastructure security service into the plurality of management nodes.

13. The system of claim 11, wherein the convergence utility tool is to:

identify the infrastructure security nodes in the cloud computing environment;

identify actual replication partners associated with each of the infrastructure security nodes;

determine the management nodes registered to each of the infrastructure security nodes and the actual replication partners;

determine workloads executing on each of the management nodes; and perform topology construction to create the actual topology using the determined infrastructure security nodes, the actual replication partners, the management nodes, and the workloads.

14. The system of claim 11, wherein the convergence utility tool is to:

categorize the management nodes based on at least one dynamic parameter; and generate, via a set of topology generating models, the set of candidate topologies from the categorized management nodes based on the actual topology.

15. The system of claim 11, wherein the convergence utility tool is to:

generate input information to execute the operation on each of the management nodes using the determined replication partners; and sequentially execute the operation on the management nodes to deploy the infrastructure security service on the management nodes based on the selection of one of the candidate topologies and the input information to form an embedded linked mode architecture.

16. The system of claim 15, wherein the convergence utility tool is to:

identify a first management node in the selected one of the candidate topologies;

deploy a first infrastructure security service on the first management node, wherein an existing infrastructure security service is set as a replication partner of the first infrastructure security service;

replicate data in the existing infrastructure security service to the first infrastructure security service;

reconfigure the first infrastructure security service and repoint the first management node to the first infrastructure security service such that the first infrastructure security service is to operate with the first management node; and repeat the steps of selecting, deploying, replicating, reconfiguring, and repointing for a next management node in the selected one of the candidate topologies based on the determined replication partner for the next management node until all the management nodes in the cloud computing environment joins the embedded linked mode architecture.

17. The system of claim 11, wherein each of the infrastructure security nodes and the management nodes is selected from a group consisting of a physical host computing system, a virtual machine, and a container.

18. A non-transitory machine-readable storage medium encoded with instructions that, when executed by a processor of a computing system, cause the processor to:

probe a cloud computing environment to detect an actual topology including connectivity between infrastructure security nodes and management nodes, each management node executing a centralized management service and each infrastructure security node executing an infrastructure security service that handles at least one infrastructure security function;

generate a set of candidate topologies based on the actual topology, each candidate topology indicates a way to replicate the infrastructure security service into the management nodes;

determine a replication partner associated with each management node based on a selection of one of the candidate topologies; and execute an operation to deploy the infrastructure security service on the management nodes based on the selected one of the candidate topologies and the determined replication partners to form an embedded linked mode architecture.

19. The non-transitory machine-readable storage medium of claim 18, further comprising instructions that, when executed by the processor, cause the processor to:

decommission the infrastructure security nodes upon deploying the infrastructure security service into the management nodes.

20. The non-transitory machine-readable storage medium of claim 18, wherein instructions to execute the operation to deploy the infrastructure security service on the management nodes comprises instructions to:

identify a first management node in the selected one of the candidate topologies;

deploy a first infrastructure security service on the first management node, wherein an existing infrastructure security service is set as a replication partner of the first infrastructure security service;

replicate data in the existing infrastructure security service to the first infrastructure security service;

reconfigure the first infrastructure security service and repoint the first management node to the first infrastructure security service such that the first infrastructure security service is to operate with the first management node; and repeat the steps of selecting, deploying, replicating, reconfiguring, and repointing for a next management node in the selected one of the candidate topologies based on the determined replication partner for the next management node until all the management nodes in the cloud computing environment joins the embedded linked mode architecture.

* * * * *